（12） United States Patent
Tsuchimoto

(10) Patent No.: US 10,830,649 B2
(45) Date of Patent: Nov. 10, 2020

(54) DEEP BODY THERMOMETER

(71) Applicant: Murata Manufacturing Co., Ltd., Nagaokakyo (JP)

(72) Inventor: Hirofumi Tsuchimoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 248 days.

(21) Appl. No.: 16/162,445

(22) Filed: Oct. 17, 2018

(65) Prior Publication Data

US 2019/0049317 A1 Feb. 14, 2019

Related U.S. Application Data

(63) Continuation of application No. PCT/JP2017/015986, filed on Apr. 21, 2017.

(30) Foreign Application Priority Data

Apr. 22, 2016 (JP) .................. 2016-085846

(51) Int. Cl.
*G01K 3/00* (2006.01)
*G01K 7/00* (2006.01)
(Continued)

(52) U.S. Cl.
CPC .............. *G01K 7/24* (2013.01); *G01K 3/14* (2013.01); *G01K 7/223* (2013.01); *G01K 7/427* (2013.01); *G01K 13/002* (2013.01)

(58) Field of Classification Search
USPC .................. 374/110, 183, 166, 208
See application file for complete search history.

(56) References Cited

U.S. PATENT DOCUMENTS 8,118,485 B2 * 2/2012 Nyffenegger ............ G01K 7/16
374/185
2010/0121217 A1 5/2010 Padiy et al.
(Continued)

FOREIGN PATENT DOCUMENTS

JP 02-283354 A 11/1990
JP 11-188014 A 7/1999
(Continued)

OTHER PUBLICATIONS

Official Communication issued in International Patent Application No. PCT/JP2017/015986, dated Jul. 25, 2017.

*Primary Examiner* — Mirellys Jagan
(74) *Attorney, Agent, or Firm* — Keating & Bennett, LLP

(57) ABSTRACT

A deep body thermometer includes a thermal resistor having a predetermined thermal resistance value, first and second temperature sensors that sandwich the thermal resistor in a thickness direction of the thermal resistor, and a temperature information processing unit to acquire a deep body temperature based on the thermal resistance value of the thermal resistor, a temperature detected by the first temperature sensor, and a temperature detected by the second temperature sensor. The first and second temperature sensors are disposed such that the first and second temperature sensors do not overlap each other as viewed from the thickness direction of the thermal resistor and a distance between the first temperature sensor and the second temperature sensor is greater than a thickness of the thermal resistor.

17 Claims, 8 Drawing Sheets

(51) Int. Cl.
*G01K 1/00* (2006.01)
*G01K 7/24* (2006.01)
*G01K 3/14* (2006.01)
*G01K 7/42* (2006.01)
*G01K 7/22* (2006.01)
*G01K 13/00* (2006.01)

(56) References Cited

U.S. PATENT DOCUMENTS

| | | | |
|---|---|---|---|
| 2010/0268113 A1* | 10/2010 | Bieberich | G01K 1/16 600/549 |
| 2010/0268114 A1* | 10/2010 | Van Duren | A61B 5/01 600/549 |
| 2011/0264001 A1 | 10/2011 | Cheung et al. | |
| 2011/0301493 A1* | 12/2011 | Husheer | G01K 7/42 600/549 |
| 2014/0278201 A1 | 9/2014 | Shimizu | |
| 2016/0069752 A1* | 3/2016 | Shimizu | G01K 7/427 600/549 |
| 2019/0142280 A1* | 5/2019 | Bongers | A61B 5/681 600/549 |
| 2020/0060553 A1* | 2/2020 | Tsuchimoto | G16H 10/60 |

FOREIGN PATENT DOCUMENTS

| | | |
|---|---|---|
| JP | 2006-136405 A | 6/2006 |
| JP | 2007-315917 A | 12/2007 |
| JP | 2009-222543 A | 10/2009 |
| JP | 2010-513911 A | 4/2010 |
| JP | 2012-132818 A | 7/2012 |
| JP | 2012-515343 A | 7/2012 |
| JP | 2012-237670 A | 12/2012 |
| JP | 2013-061232 A | 4/2013 |
| JP | 2013-200152 A | 10/2013 |
| JP | 2014-174084 A | 9/2014 |
| WO | 2008/078271 A1 | 7/2008 |

* cited by examiner

FIG. 8

| T (LAYER THICKNESS) | | | | | | | | 1.4 | | | | | | | | UNIT |
|---|---|---|---|---|---|---|---|---|---|---|---|---|---|---|---|---|
| t (DISTANCE BETWEEN SENSORS) | 0.4 | 0.4 | 0.4 | 0.406 | 0.57 | 0.75 | 0.94 | 1.13 | 1.327 | 1.524 | 1.72 | 1.919 | 2.118 | 2.315 | 2.812 | mm |
| TEMPERATURE T2 DETECTED BY SECOND SENSOR | 30.763 | 30.813 | 30.66 | 30.587 | 30.529 | 30.461 | 30.276 | 30.16 | 30.075 | 30.096 | 30.049 | 30.021 | 30.024 | 30.014 | 30.02 | 30.07 | °C |
| TEMPERATURE T1 DETECTED BY FIRST SENSOR | 32.613 | 32.653 | 32.673 | 32.678 | 32.681 | 32.668 | 32.693 | 32.697 | 32.716 | 32.7 | 32.719 | 32.721 | 32.719 | 32.72 | 32.722 | 32.725 | °C |
| DIFFERENCE BETWEEN TEMPERATURES DETECTED BY SENSORS (T1 – T2) | 1.85 | 1.8 | 2.013 | 2.091 | 2.152 | 2.207 | 2.417 | 2.537 | 2.641 | 2.604 | 2.67 | 2.7 | 2.695 | 2.706 | 2.702 | 2.655 | °C |
| X COORDINATE_OFFSET | 0 | 0.2 | 0.4 | 0.6 | 0.8 | 1 | 1.2 | 1.4 | 1.6 | 1.8 | 2 | 2.2 | 2.4 | 2.6 | 2.8 | 3.3 | mm |
| MAXIMUM DEVIATION OF TEMPERATURE (T1 – T2) CORRESPONDING TO MAXIMUM MOUNTING POSITION DEVIATION OF 0.2 mm | 0.050 | 0.173 | 0.173 | 0.078 | 0.061 | 0.210 | 0.210 | 0.120 | 0.104 | 0.066 | 0.066 | 0.030 | 0.011 | 0.011 | 0.004 | 0.047 | °C |
| Tcore ESTIMATE DEVIATION | 0.111 | 0.382 | 0.348 | 0.151 | 0.115 | 0.386 | 0.351 | 0.191 | 0.158 | 0.102 | 0.099 | 0.045 | 0.016 | 0.016 | 0.006 | 0.071 | °C |

DEEP BODY THERMOMETER

CROSS REFERENCE TO RELATED APPLICATIONS

This application claims the benefit of priority to Japanese Patent Application No. 2016-085846 filed on Apr. 22, 2016 and is a Continuation Application of PCT Application No. PCT/JP2017/015986 filed on Apr. 21, 2017. The entire contents of each application are hereby incorporated herein by reference.

BACKGROUND OF THE INVENTION

1. Field of the Invention

The present invention relates to deep body thermometers for measuring a deep body temperature and, more particularly, to a non-heating deep body thermometer.

2. Description of the Related Art

Known examples of a deep body thermometer for measuring the deep body temperature of a subject include a non-heating deep body thermometer (zero-heat-flow deep body thermometer) having a heat flow detection structure (see, for example, Japanese Unexamined Patent Application Publication No. 2013-200152). The heat flow detection structure disclosed in Japanese Unexamined Patent Application Publication No. 2013-200152 includes a predetermined thermal resistor, a first temperature sensor, and a second temperature sensor. The thermal resistor is sandwiched between the first temperature sensor and the second temperature sensor. The first temperature sensor is configured to detect a temperature at a point of contact with the body surface (skin) of a subject. The second temperature sensor is configured to detect heat transmitted from the thermal resistor.

The non-heating deep body thermometer disclosed in Japanese Unexamined Patent Application Publication No. 2013-200152 detects the difference between a temperature detected by the first temperature sensor and a temperature detected by the second temperature sensor using the heat flow detection structure so as to calculate a heat flow from the deep portion of a subject and a deep body temperature.

In order to cause a non-heating deep body thermometer (zero-heat-flow deep body thermometer) to accurately measure a deep body temperature, heat needs to stably flow (propagate) from the first temperature sensor to the second temperature sensor (that is, in the thickness direction of the thermal resistor) via the thermal resistor.

However, the path along which heat flows (the thickness of the thermal resistor) and the distance between these temperature sensors may change in accordance with the arrangement of these temperature sensors. In addition, the path along which heat flows (the thickness of the thermal resistor) and the distance between these temperature sensors may change in accordance with the sizes (physical sizes) of temperature sensors used. In addition, the path along which heat flows (the thickness of the thermal resistor) may change when the thermal resistor becomes deformed (for example, bends or crushes). Especially when the thermal resistor becomes deformed and the temperature sensors come close to each other, a situation may arise where the flow of heat transmitted directly through the temperature sensors becomes dominant.

Thus, if the path along which heat flows (the thickness of the thermal resistor) changes, this causes variations in the measurement value of a deep body temperature. The accuracy of measuring a deep body temperature may be deteriorated.

SUMMARY OF THE INVENTION

Preferred embodiments of the present invention provide non-heating deep body thermometers each capable of stably and accurately detecting a deep body temperature irrespective of the sizes of temperature sensors and whether a thermal resistor has become deformed.

A deep body thermometer according to a preferred embodiment of the present invention includes a thermal resistor having a predetermined thermal resistance value, a first temperature detection unit and a second temperature detection unit that sandwich the thermal resistor in a thickness direction of the thermal resistor, and a deep body temperature acquisition unit to acquire a deep body temperature based on the thermal resistance value of the thermal resistor, a temperature detected by the first temperature detection unit, and a temperature detected by the second temperature detection unit. The first temperature detection unit and the second temperature detection unit do not overlap each other as viewed from the thickness direction of the thermal resistor and a distance between the first temperature detection unit and the second temperature detection unit is greater than a thickness of the thermal resistor.

In a deep body thermometer according to a preferred embodiment of the present invention, the first temperature detection unit and the second temperature detection unit do not overlap each other as viewed from the thickness direction of the thermal resistor (in plan view) and a distance between the first temperature detection unit and the second temperature detection unit (a distance between both the temperature detection units) is greater than a thickness of the thermal resistor. Therefore, a path along which heat flows is able to be fixed irrespective of the sizes (physical sizes) of both the temperature detection units. Even if the thermal resistor becomes deformed (for example, the thermal resistor is bent or crushed), the direct flow of heat between both the temperature detection units is reduced or prevented. Heat is therefore able to stably flow in the thickness direction of the thermal resistor, and the variation in the measurement value of a deep body temperature is reduced or prevented. As a result, a deep body temperature is able to be stably and accurately detected irrespective of the sizes (physical sizes) of the temperature detection units and whether the thermal resistor has become deformed.

A deep body thermometer according to a preferred embodiment of the present invention preferably further includes a first wiring pattern connected to the first temperature detection unit and a second wiring pattern connected to the second temperature detection unit. The first wiring pattern and the second wiring pattern preferably at least partly overlap each other as viewed from the thickness direction of the thermal resistor.

In this case, the first wiring pattern and the second wiring pattern at least partly overlap each other as viewed from the thickness direction of the thermal resistor (in plan view). Heat tends to flow over a path having a smaller thermal resistance. Accordingly, heat stably flows (transmits) between the first wiring pattern and the second wiring pattern that overlap each other. Since the flow of heat towards the side surfaces of the thermal resistor is able to be reduced or prevented, the influence of an external perturbation (for example, an outside air temperature) is able to be reduced. As a result, a deep body temperature is able to be more stably and accurately detected irrespective of the sizes (physical sizes) of the first temperature sensors and whether the thermal resistor has become deformed.

In a deep body thermometer according to a preferred embodiment of the present invention, each of the first wiring pattern and the second wiring pattern is preferably a ground pattern or a power supply pattern located at a substrate.

Using a ground pattern or a power supply pattern located at a substrate, the first wiring pattern and the second wiring pattern are able to be provided.

In a deep body thermometer according to a preferred embodiment of the present invention, the first wiring pattern and the second wiring pattern preferably have different areas and are preferably positioned such that one of the wiring patterns is located inside the other one of the wiring patterns as viewed from the thickness direction of the thermal resistor.

In this case, the first wiring pattern and the second wiring pattern have different areas and one of the wiring patterns is located inside the other one of the wiring patterns as viewed from the thickness direction of the thermal resistor (in plan view). The change in the area of a region where both the wiring patterns overlap is able to be reduced even in a case where misalignment between the first wiring pattern and the second wiring pattern (the variation in mounting position or the variation in assembly) occurs at the time of, for example, manufacturing. Accordingly, a deep body temperature is able to be more stably and accurately detected even if the misalignment between the first wiring pattern and the second wiring pattern occurs at the time of, for example, manufacturing.

A deep body thermometer according to a preferred embodiment of the present invention preferably includes two pairs of sensing units each at least including the thermal resistor, the first temperature detection unit, and the second temperature detection unit. The thermal resistors of the respective sensing units preferably have the same thermal resistance value. The deep body temperature acquisition unit preferably acquires a deep body temperature based on the thermal resistance value of the thermal resistors, an average value of temperatures detected by the first temperature detection units of the respective sensing units, and an average value of temperatures detected by the second temperature detection units of the respective sensing units.

In this case, two pairs of the sensing units including the thermal resistors having the same thermal resistance value are provided. The temperatures detected by both the sensing units are averaged. As a result, for example, even if local temperature variations (unevenness) occur, a deep body temperature is able to be stably acquired.

A deep body thermometer according to a preferred embodiment of the present invention preferably includes two pairs of sensing units each at least including the thermal resistor, the first temperature detection unit, and the second temperature detection unit. The thermal resistors of the respective sensing units have different thermal resistance values. The deep body temperature acquisition unit preferably acquires a deep body temperature based on the thermal resistance values of the thermal resistors of the respective sensing units, temperatures detected by the first temperature detection units of the respective sensing units, and temperatures detected by the second temperature detection units of the respective sensing units.

In this case, two pairs of the sensing units including the thermal resistors having different thermal resistance values are provided. That is, since two heat flow systems including the thermal resistors having different thermal resistance values are provided, the term of the thermal resistance of a human body is able to be canceled. Even if the thermal resistance of a human body is unknown, a deep body temperature is able to be calculated. Since a deep body temperature is able to be acquired without the assumption of the thermal resistance of a human body, the deep body temperatures of respective users (subjects) having different thermal resistances are able to be more accurately acquired.

According to preferred embodiments of the present invention, non-heating deep body thermometers are able to stably and accurately detect a deep body temperature irrespective of the sizes (physical sizes) of temperature sensors and whether a thermal resistor has become deformed.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a table indicating deep body temperature estimate deviations corresponding to variations in the mounting positions of temperature sensors when the distance between the temperature sensors is changed.

DETAILED DESCRIPTION OF THE PREFERRED EMBODIMENTS

Figure 1:
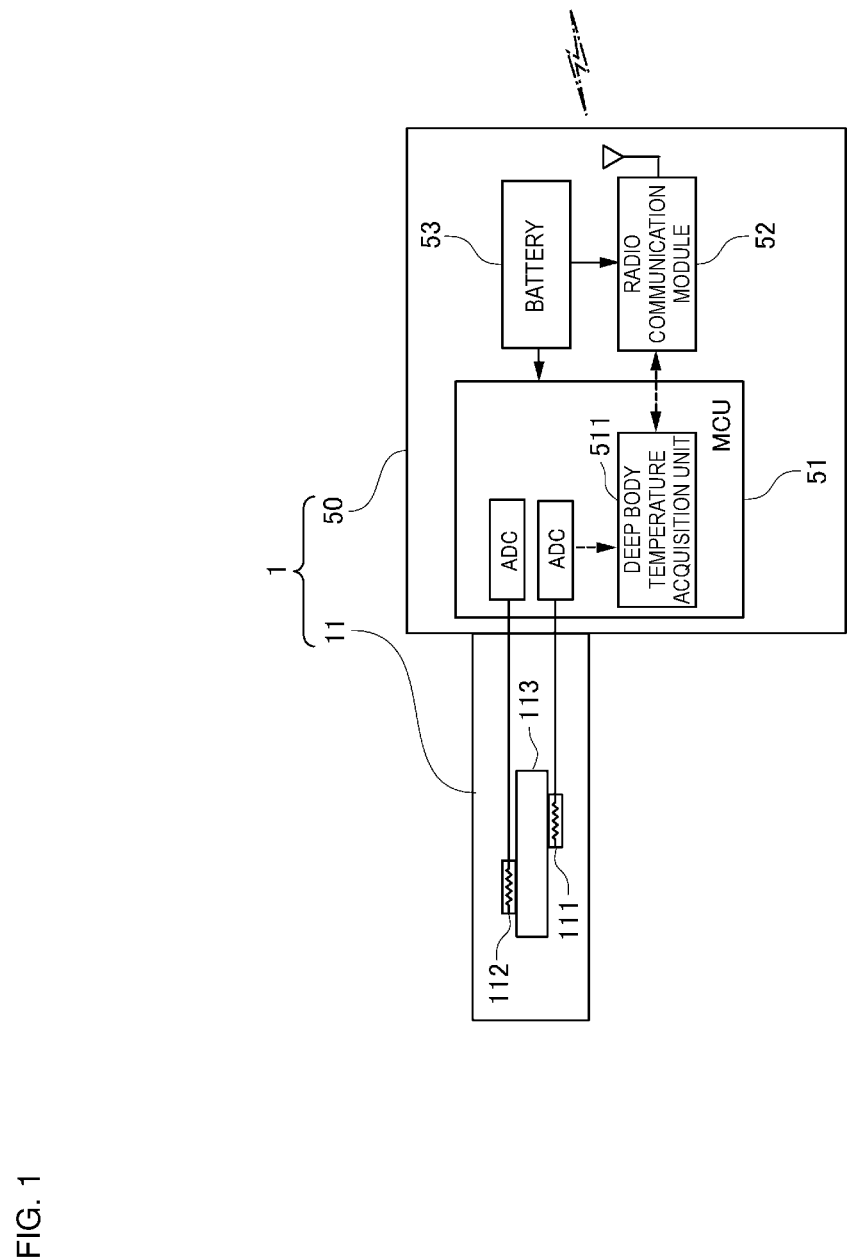
FIG. 1 is a block diagram illustrating the functional configuration of a deep body thermometer according to a first preferred embodiment of the present invention.

Preferred embodiments of the present invention will be described in detail below with reference to the accompanying drawings. In the drawings, the same reference numeral is used to represent the same element or the corresponding element so as to avoid repeated explanation.

First Preferred Embodiment

Figure 2:
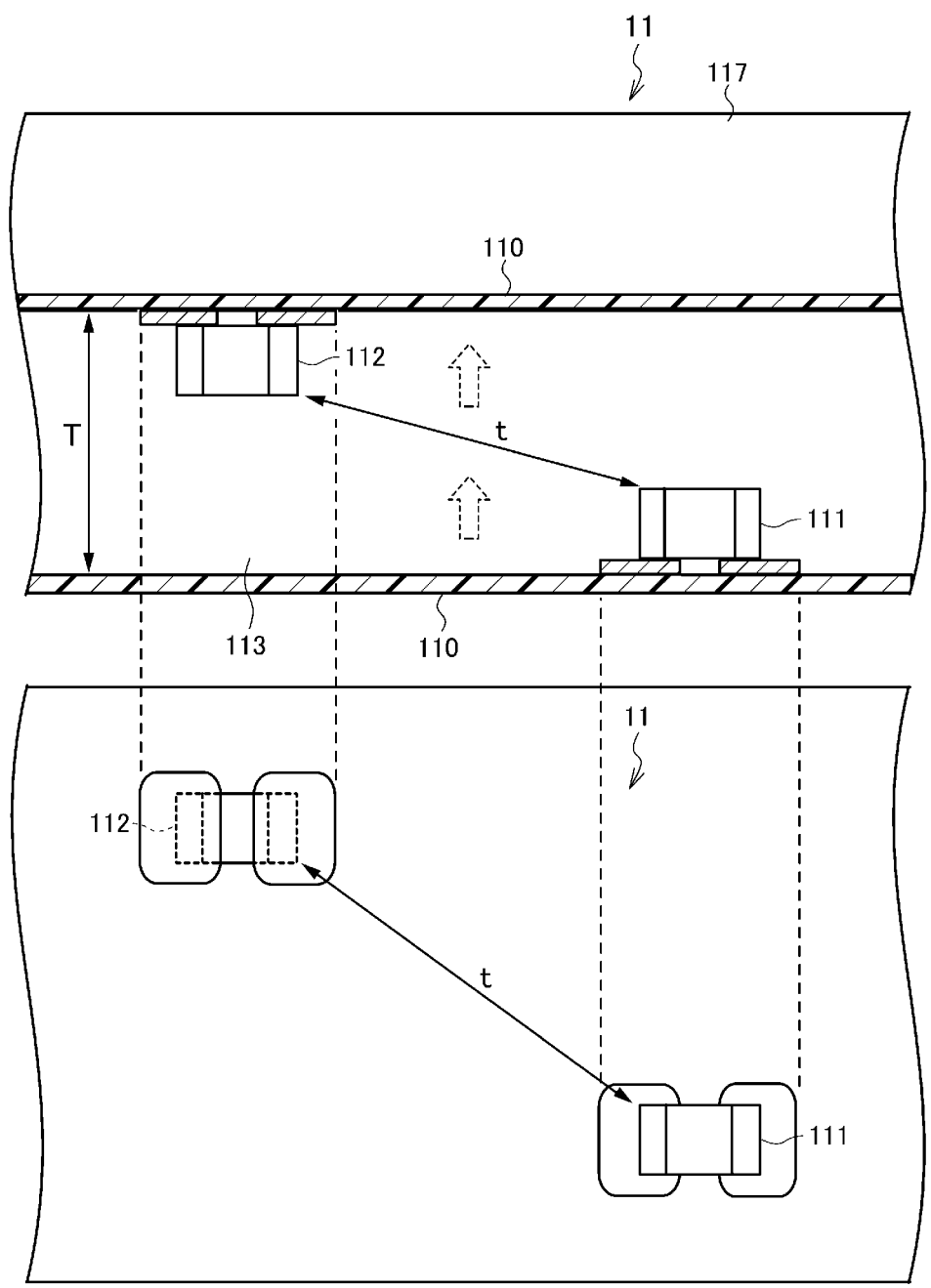
FIG. 2 (upper drawing) is a longitudinal cross-sectional view of a sensing unit of a deep body thermometer according to the first preferred embodiment of the present invention, and FIG. 2 (lower drawing) is a diagram describing the arrangement of respective temperature sensors.

A non-heating deep body thermometer 1 according to the first preferred embodiment will be described with reference to FIGS. 1 and 2. FIG. 1 is a block diagram illustrating the functional configuration of the non-heating deep body thermometer 1. FIG. 2 (upper drawing) is a longitudinal cross-sectional view of a sensing unit 11 of the deep body thermometer 1, and FIG. 2 (lower drawing) is a diagram describing the arrangement of respective temperature sensors 111 and 112.

The deep body thermometer 1 is a non-heating deep body thermometer that calculates a heat flow from the deep portion of a user (subject) based on a difference between temperatures detected by the first temperature sensor 111 and the second temperature sensor 112 of the sensing unit 11 to acquire a deep body temperature. The deep body thermometer 1 has a function of stably and accurately detecting a deep body temperature irrespective of the sizes (physical sizes) of the first temperature sensor 111 and the second temperature sensor 112 and whether a thermal resistor 113 has become deformed.

The deep body thermometer 1 therefore includes the sensing unit 11 that is attached to a body surface to detect a temperature and a temperature information processing unit 50 that acquires a deep body temperature based on the temperature detected by the sensing unit 11. The sensing unit 11 includes a flexible circuit board 110, the first temperature sensor 111, the second temperature sensor 112, and the thermal resistor 113. The temperature information processing unit 50 includes an MCU 51 (a deep body temperature acquisition unit 511), a radio communication module 52, and a battery 53. Respective components will be described in detail below.

The sensing unit 11 is attached to the body surface of a user to detect the temperature of, for example, the body surface of the user. The sensing unit 11 therefore includes the thermal resistor 113 having a predetermined thermal resistance value and a pair of temperature sensors that are disposed at the flexible circuit board (film circuit board) 110 to sandwich the thermal resistor 113 in the thickness direction of the thermal resistor 113, that is, the first temperature sensor 111 (corresponding to a first temperature detection unit) and the second temperature sensor 112 (corresponding to a second temperature detection unit). The sensing unit 11 further includes a heat insulating sheet or member 117 that is disposed to cover the thermal resistor 113 and the second temperature sensor 112.

The thermal resistor 113 has, for example, a rectangular or substantially rectangular thin sheet shape having a predetermined thickness. The shape of the thermal resistor 113 is not limited to the rectangular or substantially rectangular shape and may be, for example, a circular or a substantially circular shape. The thermal resistor 113 is made of a material having thermal insulation, such as a polyethylene foam or a urethane foam. The thermal resistor 113 has flexibility to follow the shape and motion of a body surface. It is desirable that the thickness of the thermal resistor 113 be approximately 0.1 mm to approximately several millimeters in consideration of thermal insulation and flexibility.

The first temperature sensor 111 and the second temperature sensor 112, which are disposed to sandwich the thermal resistor 113 in the thickness direction of the thermal resistor 113, are disposed such that they do not overlap each other as viewed from the thickness direction of the thermal resistor 113 (in plan view) and the distance between the first temperature sensor 111 and the second temperature sensor 112 (the distance between both temperature sensors) is greater than the thickness of the thermal resistor 113.

More specifically, the first temperature sensor 111 disposed in a lower layer and the second temperature sensor 112 disposed in an upper layer are displaced to positions where "a distance t between both sensors>a thickness T of the thermal resistor 113" is satisfied as illustrated in FIG. 2.

Large amount of heat flows to a path having a small thermal resistance. When the distance t between both sensors is smaller than the thickness T of the thermal resistor 113, the thermal resistance of a path linearly connecting both of the sensors is smaller than the thermal resistance of the thermal resistor 113 in the thickness direction of the thermal resistor 113. Therefore, when heat flows through this path (between both of the sensors), the correlation between the thickness T of the thermal resistor 113 and an interlayer temperature difference, which is a design parameter, is deteriorated. However, by disposing the first temperature sensor 111 and the second temperature sensor 112 as described above, the temperature of each layer based on the physical sizes of the first temperature sensor 111 and the second temperature sensor 112 and the difference between a temperature detected by the first temperature sensor 111 and a temperature detected by the second temperature sensor 112 in the case of the thickness T of the thermal resistor 113 is able to be accurately defined at the time of definition of the thermal resistance of the thermal resistor 113. This reduces an error in a thermal resistance value (the product of a thermal resistance and the thickness T).

As the first temperature sensor 111 and the second temperature sensor 112, thermistors or resistance thermometers whose resistance values are changed in accordance with a temperature are used. It is desirable that the thermal capacities of the first temperature sensor 111 and the second temperature sensor 112 be as small as possible for the sake of increasing the responsiveness thereof. Accordingly, as the first temperature sensor 111 and the second temperature sensor 112, for example, chip thermistors are preferably used. Each of the first temperature sensor 111 and the second temperature sensor 112 is electrically connected to the temperature information processing unit 50 (the MCU 51) via a printed wire. An electric signal (voltage value) corresponding to a temperature is read into the temperature information processing unit 50 (the MCU 51).

The temperature information processing unit 50 includes the Micro Control Unit (MCU) 51, the radio communication module 52, and the battery 53.

As described above, each of the first temperature sensor 111 and the second temperature sensor 112 is connected to the temperature information processing unit 50 (the MCU 51). A detection signal (temperature information) output from each of the first temperature sensor 111 and the second temperature sensor 112 is input into the temperature information processing unit 50 (the MCU 51).

The temperature information processing unit 50 calculates a deep body temperature based on temperature information detected by each of the first temperature sensor 111 and the second temperature sensor 112. The temperature information processing unit 50 therefore functionally includes the deep body temperature acquisition unit 511. A program stored in, for example, a read-only memory (ROM) is executed by the MCU 51 in the temperature information processing unit 50, so that the function of the deep body temperature acquisition unit 511 is realized.

The deep body temperature acquisition unit 511 calculates a deep body temperature based on the thermal resistance value of the thermal resistor 113 stored in advance, a temperature detected by the first temperature sensor 111, and a temperature detected by the second temperature sensor 112. That is, the deep body temperature acquisition unit 511 defines and functions as a deep body temperature acquisition unit.

More specifically, in a case where the deep body temperature of a human body is represented by Tcore, a temperature detected by the first temperature sensor 111 is represented by T1, a temperature detected by the second temperature sensor 112 is represented by T2, an equivalent thermal resistance in a portion between the deep portion of the human body and the body surface of the human body is represented by Rcore, and an equivalent thermal resistance of the thermal resistor 113 in the thickness direction is represented by R1, the deep body temperature Tcore in the state of thermal equilibrium is able to be represented by the following equation (1).

Equation 1

$$T\text{core} = T2 + \{R1/(R\text{core}+R1)\}(T1-T2) \quad (1)$$

In a case where the thermal resistance Rcore of a human body is known or, for example, a typical (standard) thermal resistance value is set as the thermal resistance Rcore, the deep body temperature Tcore is able to be calculated from the temperature T1 detected ty the first temperature sensor 111 and the temperature T2 detected by the second temperature sensor 112. The deep body temperature Tcore acquired by the deep body temperature acquisition unit 511 is output to the radio communication module 52.

The radio communication module 52 transmits the acquired deep body temperature information to an external information terminal (for example, a smartphone) via an alternating electromagnetic field at the frequency of 13.56 MHz or through radio communication such as Bluetooth (registered trademark), for example.

The temperature information processing unit 50 includes the thin battery 53 therein. The battery 53 supplies power to the MCU 51 and the radio communication module 52.

A method of manufacturing the sensing unit 11 of the deep body thermometer 1 (a method of arranging the first temperature sensor 111 and the second temperature sensor 112 in the sensing unit 11) will be described. At the time of manufacturing the sensing unit 11, first, the first temperature sensor 111, the second temperature sensor 112, etc. are disposed at the flexible circuit board 110. Next, the flexible circuit board 110 at which the first temperature sensor 111, the second temperature sensor 112, etc. are disposed is bent to sandwich the sheet-shaped thermal resistor 113. At that time, the first temperature sensor 111 and the second temperature sensor 112 are disposed such that they do not overlap each other as viewed from the thickness direction of the thermal resistor 113 (in plan view) and the distance t between the first temperature sensor 111 and the second temperature sensor 112 is greater than the thickness T of the thermal resistor 113. Thus, the sensing unit 11 is manufactured.

Figure 7:
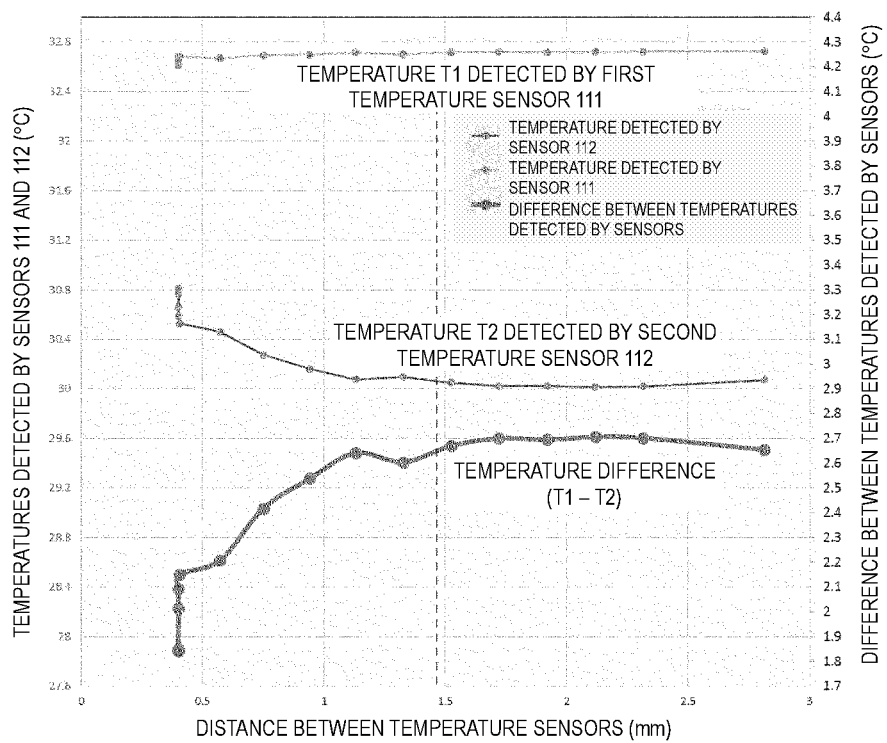
FIG. 7 is a graph illustrating temperatures detected by respective temperature sensors and the difference between the detected temperatures when the distance between the temperature sensors is changed.

The temperature T1 detected by the first temperature sensor 111, the temperature T2 detected by the second temperature sensor 112, and a temperature difference (T1−T2) were simulated and evaluated while the thickness T of the thermal resistor 113 was fixed and the distance t between the first temperature sensor 111 and the second temperature sensor 112 (the distance between the temperature sensors or the elements) was changed. A result of the simulation is illustrated in FIG. 7. FIG. 7 is a graph illustrating the temperature T1 detected by the first temperature sensor 111, the temperature T2 detected by the second temperature sensor 112, and the temperature difference (T1−T2) when the distance t between the temperature sensors is changed. Referring to FIG. 7, a horizontal axis represents the distance t (mm) between the temperature sensors and the vertical axis represents detected temperatures (° C.) and a temperature difference (° C.).

Conditions used in the simulation are as follows.

Outside air temperature Ta: 20° C.

The heat insulating member 117 (upper insulating member): the urethane material of 25 long×25 wide×1.4 thick (mm)

The second temperature sensor 112: the chip thermistor of 1.0 long×0.5 wide×0.5 height (mm)

The thermal resistor 113 (lower insulating member): the urethane material of 25 long×25 wide×1.4 thick (mm)

The first temperature sensor 111: the chip thermistor of 1.0 long×0.5 wide×0.5 height (mm)

Living body surface temperature Tb_surface: 35° C.

As illustrated in FIG. 7, in a region where the distance t between the temperature sensors was greater than the thickness T of the thermal resistor 113 (about 1.4 mm), it was confirmed that the temperature T1 detected by the first temperature sensor 111 and the temperature T2 detected by the second temperature sensor 112 were stabilized and the temperature difference (T1−T2) could be maximized. In addition, it was confirmed that the temperature difference (T1−T2) did not increase even if the distance t between the temperature sensors was increased.

Subsequently, deep body temperature estimate deviations (variations) corresponding to variations (about 0.2 mm) in the mounting positions of temperature sensors 111 and 112 were simulated and evaluated while the distance t between the temperature sensors was changed. A result of the simulation is illustrated in FIG. 8. FIG. 8 is a table indicating deep body temperature estimate deviations corresponding to variations in the mounting positions of temperature sensors 111 and 112 when the distance t between the temperature sensors is changed.

In a case where the deep body temperature Tcore is measured (estimated), the mounting positions of the temperature sensors 111 and 112 deviated from the design positions (design values) of the temperature sensors 111 and 112 are main factors to the variations in a measurement value. As illustrated in FIG. 8, it was confirmed that, in a region where the distance t between the temperature sensors>the thickness T of the thermal resistor 113 was satisfied, the deep body temperature estimate deviation was less than or equal to about 0.1° C. and was thus stabilized assuming that the mounting positions of the temperature sensors 111 and 112 were deviated from design values by about ±0.2 mm.

It is further confirmed that the deep body temperature estimate deviation was less than or equal to about 0.2° C. in a region where about 1.5t>T was satisfied even in the case of the distance t between the temperature sensors<the thickness T of the thermal resistor 113. That is, in a case where about 1.5t>T was satisfied, it was confirmed that the variation in the measurement value could be confined within about ±0.2° C. even if the mounting positions of the temperature sensors 111 and 112 were deviated by about 0.2 mm. Accordingly, it was confirmed that the deep body temperature could be stably measured (estimated) in a case where t>about 0.67×T was satisfied at the time of design.

As described in detail above, in this preferred embodiment, the first temperature sensor 111 and the second temperature sensor 112 are disposed such that they do not overlap each other as viewed from the thickness direction of the thermal resistor 113 (in plan view) and the distance between them is greater than the thickness of the thermal resistor 113. Therefore, a path along which heat flows is able to be fixed irrespective of the sizes (physical sizes) of the temperature sensors 111 and 112. Even if the thermal resistor 113 becomes deformed (for example, the thermal resistor 113 is bent or crushed), the direct flow of heat between the temperature sensors 111 and 112 is reduced. Heat is able to therefore stably flow in the thickness direction of the thermal resistor 113, and the variation in the measurement value of a deep body temperature is able to be reduced or prevented. As a result, a deep body temperature is able to be stably and accurately detected irrespective of the sizes (physical sizes) of the first temperature sensor 111 and the second temperature sensor 112 and whether the thermal resistor 113 has become deformed.

Second Preferred Embodiment

Figure 3:
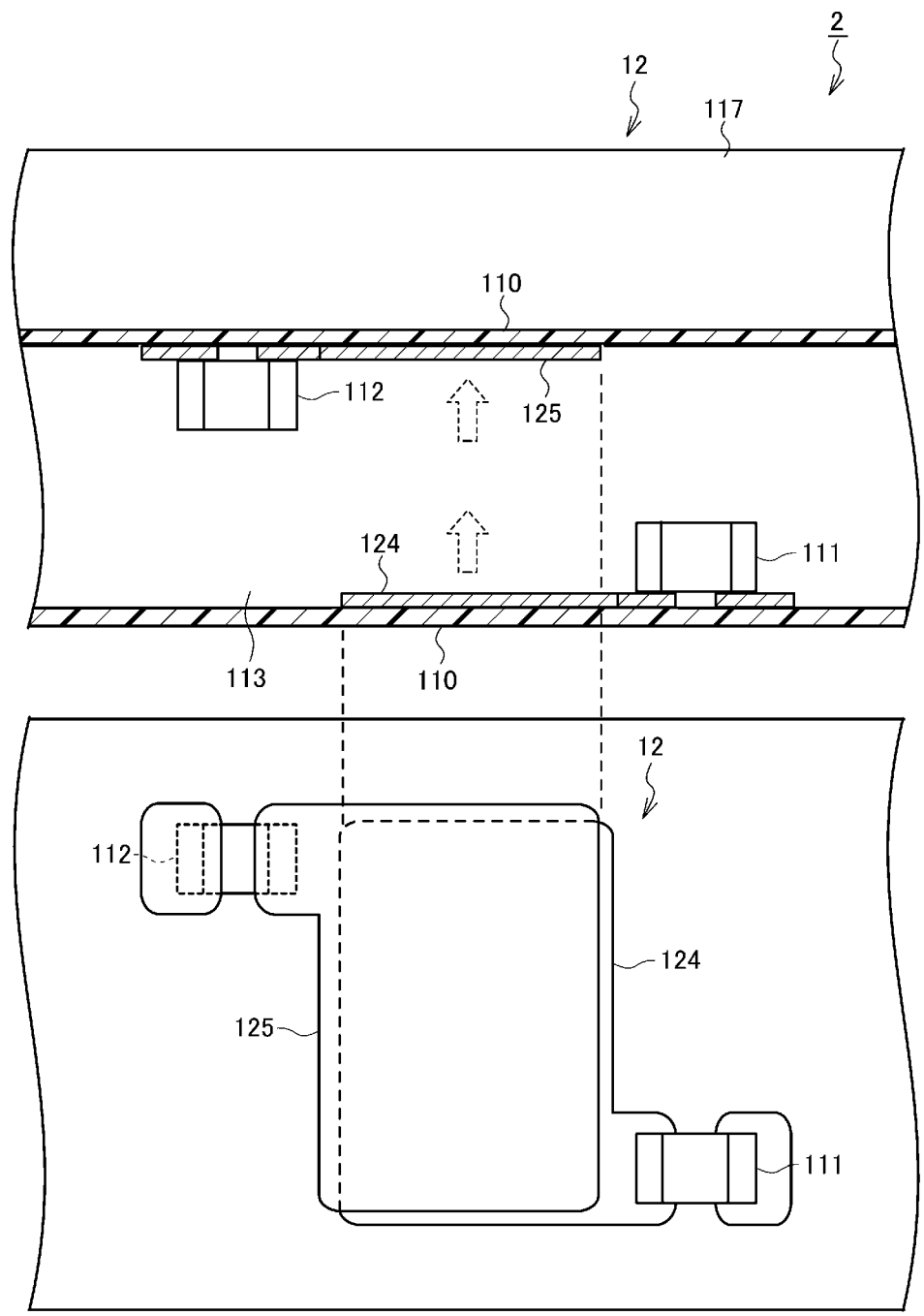
FIG. 3 (upper drawing) is a longitudinal cross-sectional view of a sensing unit of a deep body thermometer according to a second preferred embodiment of the present invention, and FIG. 3 (lower drawing) is a diagram describing the arrangement of respective temperature sensors and wiring patterns.

Next, a deep body thermometer 2 according to the second preferred embodiment will be described with reference to FIG. 3. The description of the configuration that is the same as or similar to the configuration described in the first preferred embodiment will be simplified or omitted, and the different point will be mainly described. FIG. 3 (upper drawing) is a longitudinal cross-sectional view of a sensing unit 12 of the deep body thermometer 2, and FIG. 3 (lower drawing) is a diagram describing the arrangement of the respective temperature sensors 111 and 112 and wiring patterns 124 and 125. In FIG. 3, the same or equivalent elements as the first preferred embodiment are given the same reference numerals.

The deep body thermometer 2 differs from the deep body thermometer 1 according to the first preferred embodiment in that the sensing unit 12 further includes the first wiring pattern 124 connected to the first temperature sensor 111 and the second wiring pattern 125 connected to the second temperature sensor 112. The other configuration is the same as or similar to that of the deep body thermometer 1 described above, and the detailed configuration thereof will be therefore omitted.

As each of the first wiring pattern 124 and the second wiring pattern 125, a ground pattern (or a power supply pattern) provided at the flexible circuit board 110 is able to be preferably used. The first wiring pattern 124 and the second wiring pattern 125 are disposed to (at least partially) overlap each other as viewed from the thickness direction of the thermal resistor 113 (in plan view) as illustrated in FIG. 3. The first wiring pattern 124 and the second wiring pattern 125 are made of a conductive material having a small thermal resistance, such as a thin film made of copper or aluminum. The first wiring pattern 124 and the second wiring pattern 125 preferably are rectangular or substantially rectangular in shape in FIG. 3, but do not necessarily have to be rectangular or substantially rectangular in shape.

In this preferred embodiment, the first wiring pattern 124 and the second wiring pattern 125 are disposed to overlap each other as viewed from the thickness direction of the thermal resistor 113. Heat tends to flow over a path having a smaller thermal resistance. Accordingly, heat stably flows (transmits) between the first wiring pattern 124 and the second wiring pattern 125 that overlap each other (in the thickness direction of the thermal resistor 113). Since the flow of heat towards the side surfaces of the thermal resistor 113 is able to be reduced, the influence of an external perturbation (for example, an outside air temperature) is able to be reduced. As a result, a deep body temperature is able to be more stably and accurately detected irrespective of the sizes (physical sizes) of the first temperature sensor 111 and the second temperature sensor 112 and whether the thermal resistor 113 has become deformed.

Third Preferred Embodiment

Figure 4:
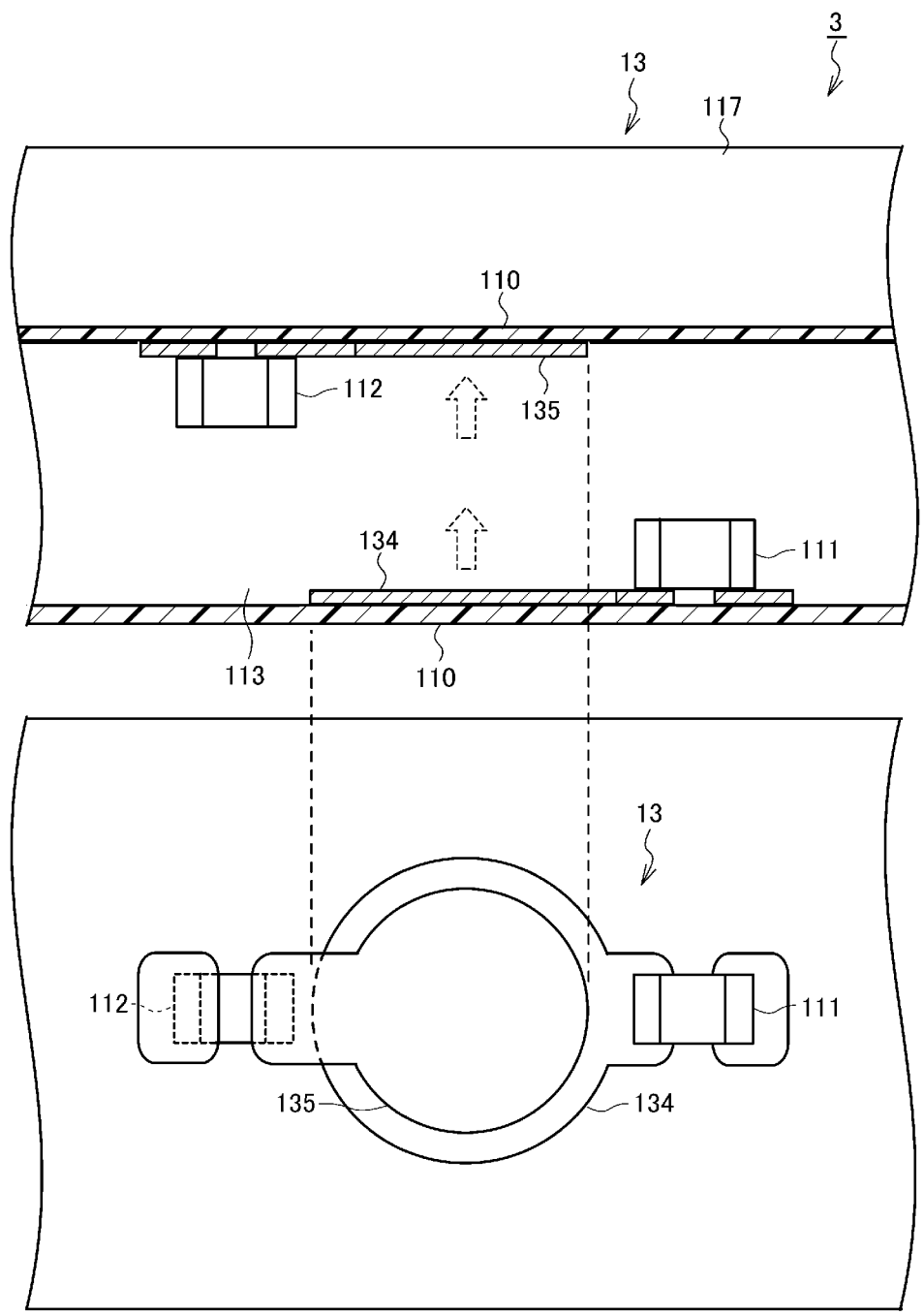
FIG. 4 (upper drawing) is a longitudinal cross-sectional view of a sensing unit of a deep body thermometer according to a third preferred embodiment of the present invention, and FIG. 4 (lower drawing) is a diagram describing the arrangement of respective temperature sensors and wiring patterns.

Next, a deep body thermometer 3 according to the third preferred embodiment will be described with reference to FIG. 4. The description of the configuration that is the same as or similar to the configuration described in the second preferred embodiment will be simplified or omitted, and the different point will be mainly described. FIG. 4 (upper drawing) is a longitudinal cross-sectional view of a sensing unit 13 of the deep body thermometer 3, and FIG. 4 (lower drawing) is a diagram describing the arrangement of the respective temperature sensors 111 and 112 and wiring patterns 134 and 135. In FIG. 4, the same or equivalent elements as the second preferred embodiment are given the same reference numerals.

The deep body thermometer 3 differs from the above-described deep body thermometer 2 according to the second preferred embodiment in that the first wiring pattern 134 and the second wiring pattern 135 of the sensing unit 13 have different areas (in FIG. 4, the area of the first wiring pattern 134>the area of the second wiring pattern 135) and one of the wiring patterns (in FIG. 4, the second wiring pattern 135) is placed inside the other one of the wiring patterns (in FIG. 4, the first wiring pattern 134) as viewed from the thickness direction of the thermal resistor 113 (in plan view). The size relationship between the first wiring pattern 134 and the second wiring pattern 135 may be reversed.

The first wiring pattern 134 and the second wiring pattern 135 are preferably circular or substantially circular in shape in FIG. 4, but do not necessarily have to be circular or substantially circular in shape. The other configuration is the same as or similar to that of the deep body thermometer 2 described above, and the detailed configuration thereof will be therefore omitted.

In this preferred embodiment, the first wiring pattern 134 and the second wiring pattern 135 have different areas and the second wiring pattern 135 is placed inside the first wiring pattern 134 as viewed from the thickness direction of the thermal resistor 113 (in plan view). The change in the area of a region where the wiring patterns 134 and 135 overlap is able to be reduced or prevented even in a case where misalignment between the first wiring pattern 134 and the second wiring pattern 135 (the vitiation in mounting position or the variation in assembly) occurs at the time of, for example, manufacturing. Accordingly, a deep body temperature is able to be more stably and accurately detected even if the misalignment between the first wiring pattern 134 and the second wiring pattern 135 occurs at the time of, for example, manufacturing.

Figure 5:
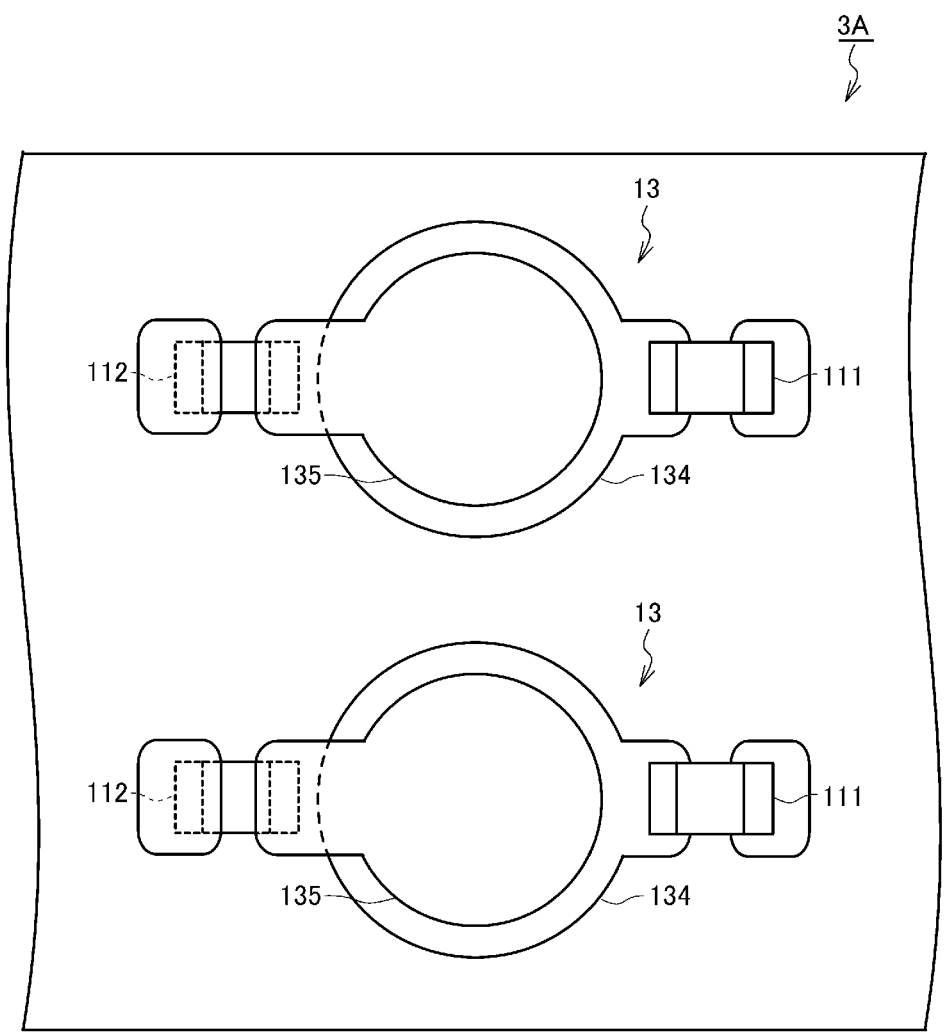
FIG. 5 is a diagram describing the arrangement of respective temperature sensors and wiring patterns in two pairs of sensing units of a deep body thermometer that is a first modification of the third preferred embodiment of the present invention.

Next, a deep body thermometer 3A that is a first modification of the third preferred embodiment will be described with reference to FIG. 5. The description of the configuration that is the same as or similar to the configuration described in the third preferred embodiment will be simplified or omitted, and the different point will be mainly described. FIG. 5 is a diagram describing the arrangement of the respective temperature sensors 111 and 112 and the wiring patterns 134 and 135 in two pairs of the sensing units 13 of the deep body thermometer 3A. In FIG. 5, the same or equivalent elements as the third preferred embodiment are given the same reference numerals.

The deep body thermometer 3A differs from the deep body thermometer 3 according to the third preferred embodiment in that it includes two pairs of the sensing units 13 (that is the same as the sensing unit 13 of the above-described deep body thermometer 3 according to the third preferred embodiment) each including the thermal resistor 113, the first temperature sensor 111, the second temperature sensor 112, the first wiring pattern 134, and the second wiring pattern 135. The thermal resistance values of the thermal resistors 113 of the respective sensing units 13 are the same.

In the deep body thermometer 3A, the temperature information processing unit 50 (the deep body temperature acquisition unit 511) calculates a deep body temperature based on the thermal resistance value of the thermal resistors 113, the average value of temperatures detected by the first temperature sensors 111 of the respective sensing units 13, and the average value of temperatures detected by the second temperature sensors 112 of the respective sensing units 13. The other configuration is the same as or similar to that of the deep body thermometer 3 described above, and the detailed configuration thereof will be therefore omitted.

In this modification, two pairs of the sensing units 13 including the thermal resistors 113 having the same thermal resistance value are provided. The temperatures detected by both of the sensing units 13 (the first temperature sensors 111 and the second temperature sensors 112) are averaged. As a result, for example, even if local temperature variations (unevenness) occur, a deep body temperature is able to be stably acquired.

Figure 6:
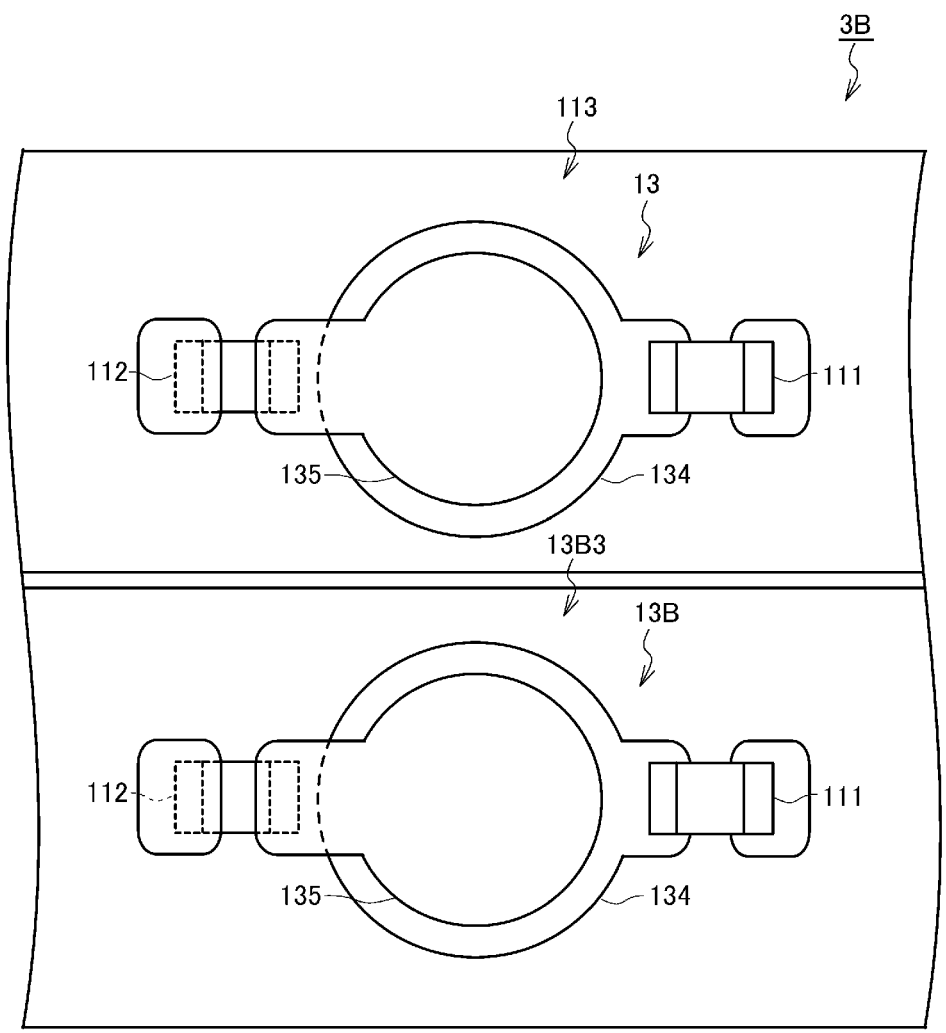
FIG. 6 is a diagram describing the arrangement of respective temperature sensors and wiring patterns in two pairs of sensing units of a deep body thermometer that is a second modification of the third preferred embodiment of the present invention.

Next, a deep body thermometer 3B that is a second modification of the third preferred embodiment will be described with reference to FIG. 6. The description of the configuration that is the same as or similar to the configuration described in the third preferred embodiment will be simplified or omitted, and the different point will be mainly described. FIG. 6 is a diagram describing the arrangement of the respective temperature sensors 111 and 112 and the wiring patterns 134 and 135 in two pairs of sensing units (the sensing unit 13 and a sensing unit 13B) of the deep body thermometer 3B. In FIG. 6, the same or equivalent elements as the first modification of the third preferred embodiment are given the same reference numerals.

The deep body thermometer 3B differs from the deep body thermometer 3A that is the first modification of the third preferred embodiment in that it includes the sensing units 13 and 13B instead of two pairs of the sensing units 13. The thermal resistance value of a thermal resistor 13B3 of the sensing unit 13B is set such that it is different from the thermal resistance value of the thermal resistor 113 of the sensing unit 13. The thermal resistance value of the thermal resistor 13B3 is able to be adjusted by changing, for example, the thickness of the thermal resistor.

In the deep body thermometer 3B, the temperature information processing unit 50 (the deep body temperature acquisition unit 511) calculates a deep body temperature based on the thermal resistance value of the thermal resistor 113 of a sensing unit 13A, a temperature detected by the first temperature sensor 111 of the sensing unit 13A, a temperature detected by the second temperature sensor 112 of the sensing unit 13A, the thermal resistance value of the thermal resistor 13B3 of the sensing unit 13B, a temperature detected by the first temperature sensor 111 of the sensing unit 13B, and a temperature detected by the second temperature sensor 112 of the sensing unit 13B. The other configuration is the same as or similar to that of the above-described deep body thermometer 3A, and the detailed description thereof will be therefore omitted.

In this modification, two pair of the sensing units 13 and 13B including the thermal resistors 113 and 13B3 having different thermal resistance values are provided. That is, since two heat flow systems having different thermal resistance values are provided, the term of the thermal resistance Rcore of a human body is able to be canceled. Even if the thermal resistance Rcore of a human body is unknown, a deep body temperature is able to be calculated. Since a deep body temperature is able to be acquired without the assumption of the thermal resistance Rcore of a human body, the deep body temperatures of respective users (subjects) having different thermal resistances Rcore is able to be more accurately acquired. As a method of canceling the thermal resistance Rcore of a human body, a known method is able to be used.

Although the preferred embodiments of the present invention have been described, the present invention is not limited to the preferred embodiments and various changes can be made to the preferred embodiments. For example, the placement of the first temperature sensor 111 and the second temperature sensor 112 and the shapes, sizes, and placement of the thermal resistors 113 and 13B3, the first wiring patterns 124 and 134, and the second wiring patterns 125 and 135 are not limited to the preferred embodiments and can be optionally set in accordance with, for example, an accuracy requirement.

The configuration of the temperature information processing unit 50 is not limited to the preferred embodiments, and may include, for example, a display unit on which an acquired deep body temperature is displayed.

The above-described configuration that is the first modification of the third preferred embodiment, the above-described configuration that is the second modification of the third preferred embodiment do not necessarily have to be applied to the deep body thermometer 3 according to the third preferred embodiment and may be applied to the deep body thermometer 1 according to the first preferred embodiment or the deep body thermometer 2 according to the second preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A deep body thermometer comprising:
a thermal resistor having a predetermined thermal resistance value;
a first temperature detection unit and a second temperature detection unit that sandwich the thermal resistor in a thickness direction of the thermal resistor; and
a deep body temperature acquisition unit that acquires a deep body temperature based on the thermal resistance value of the thermal resistor, a temperature detected by the first temperature detection unit, and a temperature detected by the second temperature detection unit; wherein
the first temperature detection unit and the second temperature detection unit do not overlap each other as viewed from the thickness direction of the thermal resistor and a distance between the first temperature detection unit and the second temperature detection unit is greater than a thickness of the thermal resistor.

2. The deep body thermometer according to claim 1, further comprising two pairs of sensing units each at least including the thermal resistor, the first temperature detection unit, and the second temperature detection unit; wherein
the thermal resistors of the respective sensing units have the same thermal resistance value; and
the deep body temperature acquisition unit acquires a deep body temperature based on the thermal resistance value of the thermal resistors, an average value of temperatures detected by the first temperature detection units of the respective sensing units, and an average value of temperatures detected by the second temperature detection units of the respective sensing units.

3. The deep body thermometer according to claim 1, further comprising two pairs of sensing units each at least including the thermal resistor, the first temperature detection unit, and the second temperature detection unit; wherein
the thermal resistors of the respective sensing units have different thermal resistance values; and
the deep body temperature acquisition unit acquires a deep body temperature based on the thermal resistance values of the thermal resistors of the respective sensing units, temperatures detected by the first temperature detection units of the respective sensing units, and temperatures detected by the second temperature detection units of the respective sensing units.

4. The deep body thermometer according to claim 1, wherein the deep body thermometer is a non-heating deep thermometer.

5. The deep body thermometer according to claim 1, wherein the thermal resistor is a made of a thermal insulation material.

6. The deep body thermometer according to claim 1, wherein in a case where the deep body temperature of a human body is represented by Tcore, a temperature detected by the first temperature detection unit is represented by T1, a temperature detected by the second temperature detection unit is represented by T2, an equivalent thermal resistance in a portion between a deep portion of the human body and a body surface of the human body is represented by Rcore, and an equivalent thermal resistance of the thermal resistor in the thickness direction is represented by R1, the deep body temperature Tcore in a state of thermal equilibrium is represented by an equation:

$$Tcore=T2+\{R1/(Rcore+R1)\}(T1-T2).$$

7. The deep body thermometer according to claim 1, wherein the thermal resistor has a shape that is rectangular, substantially rectangular, circular or substantially circular.

8. The deep body thermometer according to claim 1, further comprising a temperature information processing unit including the deep body temperature acquisition unit, a radio communication module, and a battery.

9. The deep body thermometer according to claim 8, wherein the radio communication module transmits acquired deep body information to an external information terminal.

10. The deep body thermometer according to claim 1, further comprising a sensing unit that includes a flexible circuit board, a first temperature sensor, a second temperature sensor, and the thermal resistor.

11. The deep body thermometer according to claim 10, wherein the sensing unit includes a heat insulating sheet.

12. The deep body thermometer according to claim 10, wherein each of the first and second temperature sensors include a thermistor or a resistance thermometer.

13. The deep body thermometer according to claim 1, further comprising:
a first wiring pattern connected to the first temperature detection unit; and
a second wiring pattern connected to the second temperature detection unit; wherein
the first wiring pattern and the second wiring pattern at least partly overlap each other as viewed from the thickness direction of the thermal resistor.

14. The deep body thermometer according to claim 13, wherein each of the first wiring pattern and the second wiring pattern is a ground pattern or a power supply pattern provided at a substrate.

15. The deep body thermometer according to claim 13, wherein the first wiring pattern and the second wiring pattern have different areas, and one of the first and second wiring patterns is located inside the other of the first and second wiring patterns as viewed from the thickness direction of the thermal resistor.

16. The deep body thermometer according to claim 13, wherein the first wiring pattern and the second wiring pattern each has a shape that is rectangular or substantially rectangular.

17. The deep body thermometer according to claim 13, wherein the first wiring pattern and the second wiring pattern each has a shape that is circular or substantially circular.

* * * * *